No. 732,118. PATENTED JUNE 30, 1903.
E. G. H. SCHENCK.
MACHINE FOR CUTTING PRECIOUS STONES.
APPLICATION FILED MAR. 27, 1902.
NO MODEL.
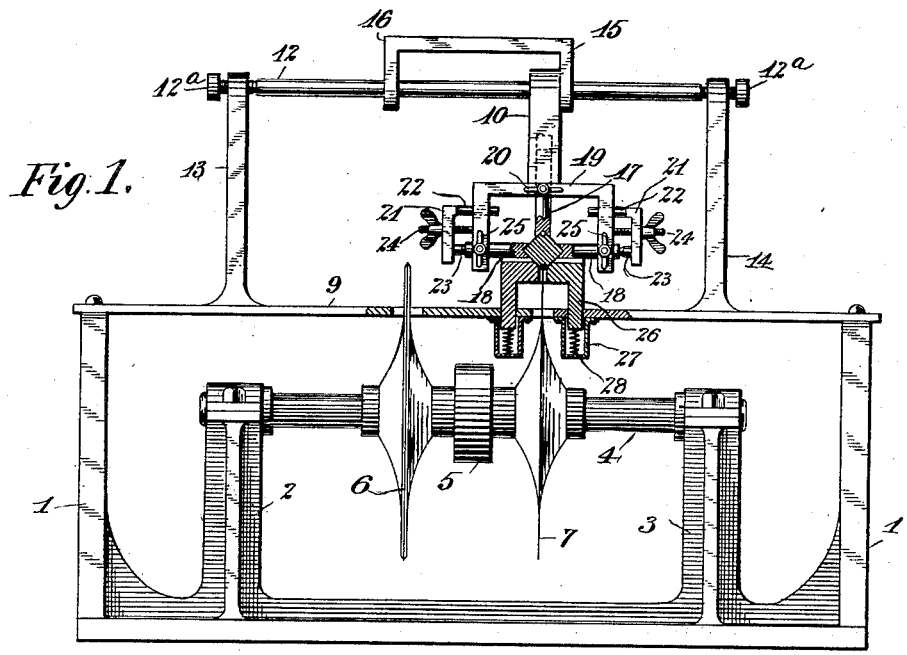
Witnesses
Inventor:
Ernest G. H. Schenck,
By his Attorney No. 732,118.

Patented June 30, 1903.

UNITED STATES PATENT OFFICE.

ERNEST G. H. SCHENCK, OF ORANGE, NEW JERSEY.

MACHINE FOR CUTTING PRECIOUS STONES.

SPECIFICATION forming part of Letters Patent No. 732,118, dated June 30, 1903.

Application filed March 27, 1902. Serial No. 100,163. (No model.)

*To all whom it may concern:*

Be it known that I, ERNEST G. H. SCHENCK, a subject of the King of Belgium, residing at Orange, New Jersey, have invented certain new and useful Improvements in Machines for Cutting Precious Stones, of which the following is a clear, full, and exact description.

My invention relates to a machine for cutting precious stones; and my object is to improve the construction of the same, and in my preferred embodiment I have provided a machine which will first notch the stone and then divide it, leaving the stone partially provided with facets, thereby saving much labor and preventing the loss in weight which is unavoidable by previous methods of cutting stones.

My invention will be defined in the claims.

The drawings show my preferred embodiment of my invention; but I do not limit myself to this construction.

In said drawings, Figure 1 shows a front elevation, parts being in section, of my machine; Fig. 2, a side elevation looking from left to right in Fig. 1; Fig. 3, a stone notched ready for splitting, and Fig. 4 the same stone divided along the plane of the girdle. Fig. 5 is a plan view of Fig. 3.

In a contemporaneously-pending application I have disclosed a method of cutting a stone, preferably by cutting one or more sloping-sided notches in said stone, the bottom of said notches lying in the plane of the girdle, and then splitting said stone by sawing through it with a fine saw in the plane of the girdle from the bottom of one notch to the bottom of the other. A stone so notched is shown in Fig. 3, and the divisions of the stone when sawed through are shown in Fig. 4.

In cutting and working precious stones, such as diamonds and the like, great accuracy is required, as it is desirable to prevent, so far as possible, loss of weight by the stone in cutting. In dividing a stone by my machine (shown in the drawings) there is practically no loss in weight except where the stone is notched, as shown in Fig. 3, and each division is partially finished, as each side of each notch constitutes a facet on one of the divisions.

In the drawings, 1 is the frame of the machine, having posts 2 3 provided with bearings, in which rotates a shaft 4, which may carry a pulley 5 for a driving-belt. 6 is a rotating cutting device, and 7 is preferably a circular splitting-saw, both of which may be mounted on this shaft 4; but other arrangements may be made, if desired. I prefer to first cut the stone slightly before it is split by saw 7, preferably by notching it by the cutting device 6, which in this embodiment has a sloping-sided edge. By "sloping-sided" I do not mean that both sides of the edge must necessarily slope; but in the drawings I have shown it as substantially V-shaped. This notch in the stone not only forms a facet on each subsequent division, but also starts the cut in the stone, so that the thin pliable splitting-saw 7 may start the cut at the bottom of the notch, and it will much more easily and quickly begin to cut at this point than it would if the original apex of the stone (shown in dotted lines in Fig. 3) were presented to it.

9 is a table, through slots in which the notching and sawing disks 6 and 7 slightly project.

10 denotes generally a holder for the stone. This holder is in the present embodiment formed of an L-shaped arm, as shown in Fig. 2, having a U-shaped yoke 19 and other devices as a part thereof.

In order to move the stone from one cutting device to the other, the holder in the present construction may slide on a round guide-rod 12, parallel with shaft 4, so that it will not be necessary to remove the stone from the holder or change its position therein in order to bring it against the thin saw 7. The rod 12 may be pivoted on set-screws 12ª, engaging countersunk holes in the center of the end of the rod.

It is very desirable that some means be provided to automatically so position the holder with reference to the saw 7 that a cut or the notch previously made therein will be accurately alined with the splitting-saw, as a precious stone is usually small, and it would therefore be extremely difficult to adjust it by the eye to accurately engage the thin splitting-saw. In the present embodiment I have accomplished this by providing stops 15 and 16 on rod 12, so that when the holder abuts against stop 16 the same portion (preferably the middle line) of the holder will be exactly over the extreme edge of the disk 6 and when against stop 15 will be exactly over the edge of the thin disk 7. Consequently in whatever position the stone is located in the holder when cut by disk 6 the disk 7 will, when the holder is moved to the right, exactly engage the stone where it has been cut by the extreme edge of disk 6, and if a notch has been cut therein by disk 6 the disk 7 will engage the bottom of the notch. The stone will therefore be cut at the exact point desired. A set-screw 29 may be provided to fasten the holder to rod 12 in its position abutting against either one of the stops.

In order to indicate the exact part of the stone which will be engaged by the disks, I have provided an indicator 17, which in the present embodiment is a short rod or stud vertically slidable in the holder and having a countersunk portion (shown in section) exactly in the middle line of the holder and which may engage over an apex of the girdle of the stone, as shown.

20 is a set-screw for fixing indicator 17 in position.

18 18 constitute a supplementary stone-holder, preferably in the form of short round rods parallel with shaft 4 and passing through round holes in the legs of the yoke 19, which constitute a means by which the supplementary holder and stone may be rotated on an axis at a right angle to the plane of movement of either disk 6 or 7. In order to prevent the lateral displacement of said stone when so rotated, I have provided a pair of L-shaped clamps 21, each of which has a round portion 22, which fits a round hole in a leg of the yoke, so that they may be either slid to the right or left or rotated in the holes. Each of these clamps carries a conical stud 23, which fits a conical countersunk hole in the center of the end of each rod 18.

24 is a threaded bolt attached to each leg of the yoke and passing through a hole in clamp 21 and is provided with a wing-nut, which may be screwed against the clamp to force it and rod 18 inward toward the stone.

25 represents set-screws to prevent the rotating of rods 18.

The stone may thus be accurately adjusted in the holder, the indicator 17 showing accurately what portion of the stone will be engaged by the edges of the disks, and by tightening up the clamps 21 the stone will be accurately held in position, and after one notch has been cut the set nuts 25 may be loosened and the supplementary holder 18 18 and the stone rotated on conical portions 23 to present the opposite apex to the disk, and the clamps 21 will prevent any lateral displacement of the stone when so rotated.

I prefer that the holder 10 be rotatable in a vertical plane on rod or guide 12, so that it will drop down by its own weight and automatically press the stone against the disks.

I prefer to also provide a slotted guide 26 to prevent any bending of the thin disk 7 and to keep it flat and true. This guide may be countersunk to seat the stone and assist in holding it in position as it is cut. The guide may be held in holes in the table and supported on springs 28, which are preferably strong enough to raise the guide, but so weak that they will not prevent the depression of the guide by the weight of the holder upon it. Both disks 6 and 7 in the present embodiment form a facet on each division of the stone, the disk 6 by means of its sloping edge and the disk 7 by forming the "table" of each division.

I am aware that many variations from the foregoing-described machine may be made without departing from my invention as claimed, and I therefore do not desire to be limited to the embodiment herein illustrated and described.

What I claim is—

1. In a machine for cutting a precious stone in combination, a cutting device adapted to notch said stone, a thin splitting device, a holder for said stone, said holder being relatively movable from one to the other of said devices, and means to accurately aline said notch with said splitting device, said holder and devices being movable relatively toward each other to move said stone against said devices in turn, and means whereby said stone may be rotated in said holder on an axis at a right angle to the plane of said notching device, to present another portion of said stone to said device.

2. In a machine for cutting a precious stone in combination, a cutting device having a V-shaped edge adapted to notch said stone, a thin splitting device, a holder for said stone, said holder being relatively movable from one to the other of said devices, and means to accurately aline the bottom of said notch with said splitting device, said holder and devices being movable relatively toward each other to move said stone against said devices in turn, and means whereby said stone may be rotated in said holder on an axis at a right angle to the plane of said notching device, to present another portion of said stone to said device.

3. In a machine for cutting a precious stone in combination, a rotating cutting device having a V-shaped edge adapted to cut a sloping-sided notch in a stone, a rotating thin splitting-disk, a holder for said stone adapted to move toward the edges of said devices and be also moved laterally from one to the other, a guide for said lateral movement of said holder, and means to accurately aline the bottom of said notch with said splitting-disk, and means whereby said stone may be rotated in said holder on an axis at a right angle to the plane of said notching device, to present another portion of said stone to said device.

4. In a machine for cutting a precious stone in combination, a rotating cutting device having a V-shaped edge adapted to cut a sloping-sided notch in a stone, a rotating thin splitting-disk, a holder for said stone adapted to be moved by gravity toward the edges of said devices and to be also moved laterally from one to the other, a guide for said lateral movement of said holder and a stop for said holder to accurately aline the bottom of said notch with said splitting-disk, and means whereby said stone may be rotated in said holder on an axis at a right angle to the plane of said notching device, to present another portion of said stone to said device.

5. In a machine for cutting a precious stone in combination, a cutting device adapted to cut a stone, a main holder for said stone, said holder and cutting device being movable toward each other to bring said stone and cutting device in contact, means to rotate said stone in said holder on an axis at a right angle to the plane of movement of said cutting device to present another portion of said stone to said cutting device, and means to prevent the lateral displacement of said stone when so rotated.

6. In a machine for cutting a precious stone in combination, a cutting device adapted to cut a stone, a main holder provided with a supplementary holder for said stone, said holder and cutting device being movable toward each other to bring said stone and cutting device in contact, means to rotate said supplementary holder and stone in said main holder on an axis at a right angle to the plane of movement of said cutting device to present the opposite side of said stone to said cutting device, and means to prevent the lateral displacement of said stone when so rotated.

7. In a machine for cutting a precious stone in combination, a cutting device adapted to cut a sloping-sided notch in a stone, a holder for said stone, said holder and cutting device being movable toward each other to bring said stone and cutting device in contact, means to rotate said stone in said holder on an axis at a right angle to the plane of movement of said cutting device to present another portion of said stone to said cutting device, and means to prevent the lateral displacement of said stone when so rotated.

8. In a machine for cutting a precious stone in combination, a rotating cutting device having a V-shaped edge adapted to cut a sloping-sided notch in a stone, a main holder provided with a supplementary holder for said stone, a thin splitting-disk, said holder being movable by gravity toward either of said devices to bring said stone in contact therewith, means to rotate said supplementary holder and stone in said main holder on an axis at a right angle to the plane of movement of said cutting devices to present another portion of said stone to said cutting device, means to prevent the lateral displacement of said stone when so rotated, a guide for said holder from said cutting device to said splitting-disk, and stops on said guide to aline the same portion of said holder with the edges of said cutting device and splitting-disk.

9. In a machine for cutting a precious stone in combination, a cutting device adapted to cut a stone, a splitting device adapted to split a stone, a holder for said stone movable from the one to the other, and means to accurately aline the same portion of said holder with each of said devices, and an indicator carried by said holder to indicate the line of cut in each of the positions of said holder, whereby said stone may be accurately adjusted in said holder to present the proper portion to each of said devices.

10. In a machine for cutting a precious stone in combination, a rotating cutting device having a V-shaped edge adapted to cut a sloping-sided notch in a stone, a main holder provided with a supplementary holder for said stone, a thin splitting-disk, said holder being movable toward either of said devices to bring said stone in contact therewith, means to rotate said supplementary holder and stone in said main holder on an axis at a right angle to the plane of movement of one of said cutting devices to present another portion of said stone to said cutting device, means to prevent the lateral displacement of said stone when so rotated, a guide for said holder from said cutting device to said splitting-disk, and means to aline the same portion of said holder with the edges of said cutting device and splitting-disk.

11. In a machine for cutting a precious stone in combination, a cutting device adapted to cut a stone, a main holder for said stone, said holder and cutting device being movable toward each other to bring said stone and cutting device in contact, means to rotate said stone in the holder on an axis at a right angle to the plane of movement of said cutting device to present another portion of said stone to said cutting device, means to prevent the lateral displacement of said stone when so rotated, and a spring-supported rest for said stone independent of said holder and provided with an opening through which the edge of said cutting device projects.

Signed at New York, N. Y., this 21st day of March, 1902.

ERNEST G. H. SCHENCK.

Witnesses:
EMERSON R. NEWELL,
THOMAS F. HASTINGS.